US012579256B2

(12) United States Patent
Palanki et al.

(10) Patent No.: US 12,579,256 B2
(45) Date of Patent: Mar. 17, 2026

(54) LARGE LANGUAGE MODEL (LLM) SUPPLY CHAIN SECURITY

(71) Applicant: American Express Travel Related Services Company, Inc., New York, NY (US)

(72) Inventors: Hiranmayi Palanki, Tampa, FL (US); Shankar Djeyassilane, Markham (CA)

(73) Assignee: American Express Travel Related Services Company, Inc., New York, NY (US)

( * ) Notice: Subject to any disclaimer, the term of this patent is extended or adjusted under 35 U.S.C. 154(b) by 364 days.

(21) Appl. No.: 18/462,848

(22) Filed: Sep. 7, 2023

(65) Prior Publication Data

US 2025/0086270 A1     Mar. 13, 2025

(51) Int. Cl.
G06F 21/55 (2013.01)
G06Q 10/0875 (2023.01)
G06F 21/57 (2013.01)

(52) U.S. Cl.
CPC ......... G06F 21/55 (2013.01); G06Q 10/0875 (2013.01); G06F 21/577 (2013.01); G06F 2221/033 (2013.01)

(58) Field of Classification Search
CPC .. G06F 21/55; G06F 2221/033; G06F 21/577; G06Q 10/0875
See application file for complete search history.

(56) References Cited

U.S. PATENT DOCUMENTS

| | | | | |
|---|---|---|---|---|
| 11,669,622 B2 * | 6/2023 | Yi | ......................... | G06F 21/577 |
| | | | | 726/25 |
| 12,223,035 B2 * | 2/2025 | Zmijewski | ................ | G06F 8/71 |
| 2024/0411895 A1 * | 12/2024 | Dubey | .................. | G06F 21/577 |

* cited by examiner

*Primary Examiner* — Lynn D Feild
*Assistant Examiner* — Kelah Janae Mcfarland-Barnes
(74) *Attorney, Agent, or Firm* — Thomas | Horstemeyer, LLP

(57) ABSTRACT

Disclosed are various approaches for large language model (LLM) supply chain security. In one example, an LLM-extended software bill of materials can be extended to provide LLM specific supply chain information for an LLM application that communicates with an LLM service. The LLM-extended software bill of materials can be attached to the LLM application. An LLM specific security test can be performed on the LLM application. A signed LLM security test attestation can be attached to the LLM-extended software bill of materials based on completion of the automated LLM security test. The LLM application or the LLM-extended software bill of materials can be published or transmitted to a predetermined network endpoint.

20 Claims, 6 Drawing Sheets

LARGE LANGUAGE MODEL (LLM) SUPPLY CHAIN SECURITY

BACKGROUND

Large language models (LLMs) are expanding the use of artificial intelligence (AI) exponentially. As this expansion continues, companies developing LLMs will contend with the challenges of ensuring the security of large amounts of data. The security of the data in the LLM itself is important, as are the responses that it creates for users. One of the significant concerns is the potential for misuse and errors introduced by the ubiquitous use of LLMs. These models can generate highly realistic and coherent text, making them a tool with the ability to provide great utility as well as great harm.

Their potential for misuse is concerning, enabling the creation of deceptive and inaccurate content. Biases can perpetuate unfair commentary that can contribute to societal problems. LLMs also raise privacy concerns as they could inadvertently generate text containing sensitive personal and enterprise information. As the use of LLMs proliferates, there is a need for enterprises to have a way to ensure that applications and programmatic usage of an LLM is safe, secure, and free from the various LLM specific issues. There is a further need to ensure that this safety has been tested at various points of development.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for large language model (LLM) supply chain security and provenance. LLMs are expanding in use. As this expansion continues, enterprises developing LLMs and applications that interact with LLMs will contend with the challenges of ensuring the security of large amounts of data. The security of the data in the LLM itself is important, as are the responses that it creates for users. One of the significant concerns is the potential for misuse and errors introduced by the LLMs. These models can generate highly realistic and coherent text, making them a tool with the ability to provide great utility as well as great harm.

The potential for misuse of LLMs is concerning, enabling the creation of deceptive and inaccurate content. Biases can perpetuate unfair commentary that can contribute to societal problems. LLMs also raise privacy concerns as they could inadvertently generate text containing sensitive personal and enterprise information. As the use of LLMs proliferates, there is a need for enterprises to have a way to ensure that applications and programmatic usage of an LLM is safe, secure, according to specific types of tests performed at various points of development.

The mechanisms described in the present disclosure include extending a software bill of materials (SBOM), to include LLM specific provenance parameters that enable signed attestations, and attaches this LLM-extended SBOM to an application build of an application or set of instructions that interacts with an LLM. The mechanisms described in the present disclosure include attaching signed LLM specific attestations to the LLM-extended SBOM that indicate the results of LLM specific tests performed in the supply chain and overall internal and external development and testing pipeline.

In the following discussion, a general description of the LLM supply chain security and provenance system is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
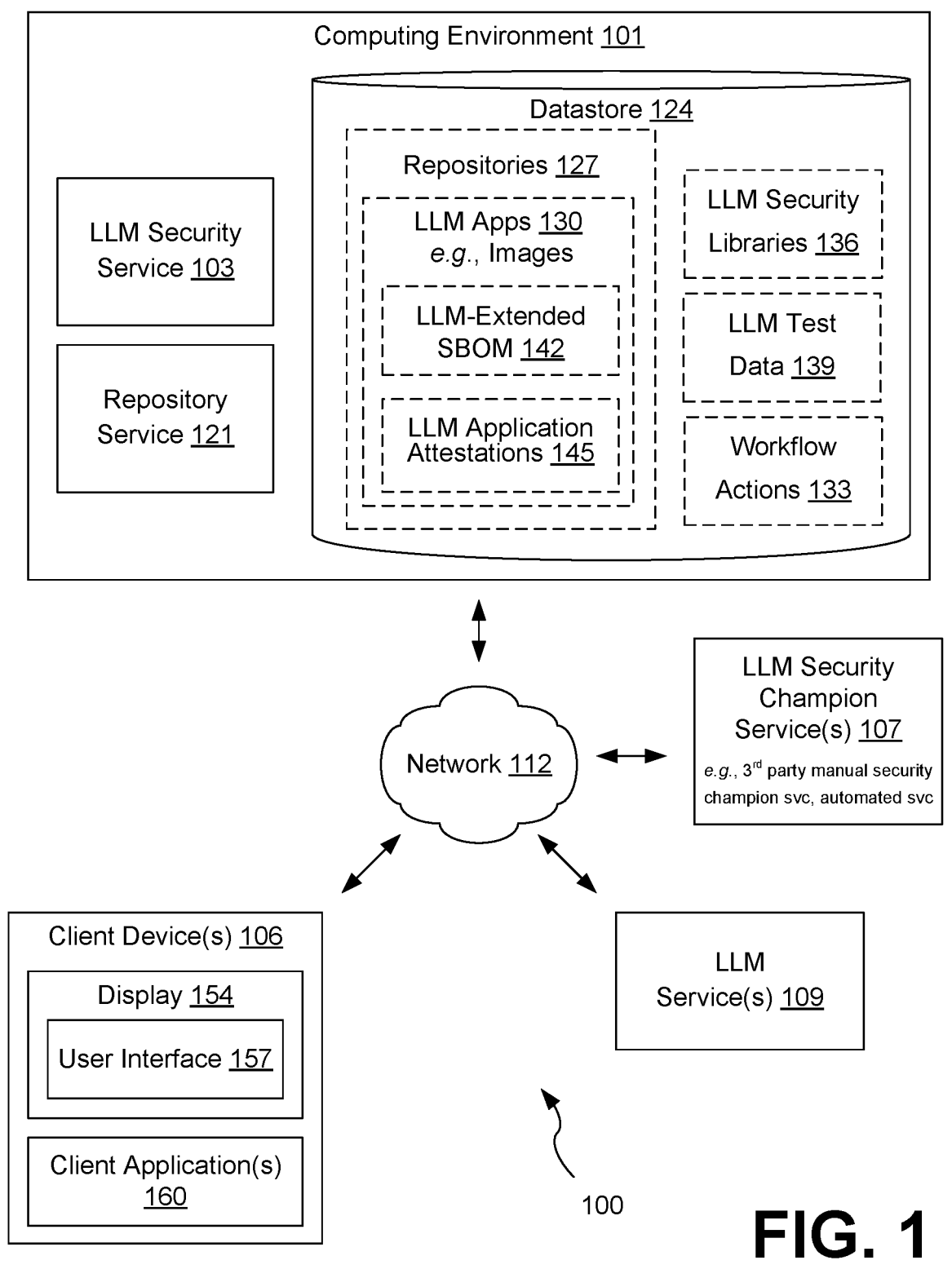
FIG. 1 is a drawing of a networked environment that includes components for large language model (LLM) supply chain security according to various embodiments of the present disclosure.

With reference to FIG. 1, shown is a networked environment 100 according to various embodiments. The networked environment 100 can include a computing environment 101 for an LLM security service 103, a client device 106, LLM security champion services 107, and LLM services 109, which can be in data communication with each other via a network 112. Although depicted and described separately, the LLM service 109 can also be included in or operate as a subcomponent of the computing environment 101 and/or the LLM security service 103 in various embodiments of the present disclosure.

The network 112 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 101 can include one or more computing devices that include a processor, a memory, and/or a network interface. For example, the computing devices can be configured to perform computations on behalf of other computing devices or applications. As another example, such computing devices can host and/or provide content to other computing devices in response to requests for content. The computing environment 101 can provide an environment for the LLM security service 103, a repository service 121, and other executable instructions.

Moreover, the computing environment 101 can employ a plurality of computing devices that can be arranged in one or more server banks or computer banks or other arrangements. Such computing devices can be located in a single installation or can be distributed among many different geographical locations. For example, the computing environment 101 can include a plurality of computing devices that together can include a hosted computing resource, a grid computing resource or any other distributed computing arrangement. In some cases, the computing environment 101 can correspond to an elastic computing resource where the allotted capacity of processing, network, storage, or other computing-related resources can vary over time. Various applications or other functionality can be executed in the computing environment 101. The components executed on the computing environment 101 include a LLM security service 103, and other applications, services, processes, systems, engines, or functionality not discussed in detail herein.

Various data is stored in a datastore 124 that is accessible to the computing environment 101. The datastore 124 can be representative of a plurality of datastores 124, which can include relational databases or non-relational databases such as object-oriented databases, hierarchical databases, hash tables or similar key-value datastores, as well as other data storage applications or data structures. Moreover, combinations of these databases, data storage applications, and/or data structures can be used together to provide a single, logical, datastore. The data stored in the datastore 124 is associated with the operation of the various applications or functional entities described below.

The data is stored in a datastore 124 can include repositories 127 of a repository service 121, workflow actions 133, LLM security libraries 136, and LLM test data 139, among other items which can include executable and non-executable data. Each of the repositories 127 can include one or more LLM application 130. The LLM application 130 can refer to an image of an application that interacts with one or more LLM service 109. The LLM application 130 can be referred to as an LLM interaction application.

As the LLM application 130 is processed from an initial version to a branch variant that is tested with various LLM specific tests, the LLM security service 103 can attach a LLM-extended SBOM 142 and a set of signed LLM attestations 145 corresponding to the LLM specific tests. Additional LLM attestations 145 can indicate a position in an LLM supply chain, as well as users, groups, business units, and other information associated with the position in the LLM supply chain.

LLM attestations 145 can refer to any signed attestation that indicates information related to a software development pipeline that is specific to and designed for LLM applications 130 that interact with LLM services 109. The LLM attestations 145 can include a number of LLM security tests performed on the LLM applications 130, where various ones of the LLM security tests are performed at various stages or positions in the LLM specific software development pipeline. Multiple tests can be performed at one position of the pipeline, or each test can be associated with a discrete or distinct position in the pipeline.

LLM test data 139 can include a list of LLM specific tests that are to be applied at various stages of a supply chain or development pipeline. LLM test data 139 can include the tests themselves as executable code that performs a test in an automated programmatic fashion. LLM specific tests can involve tests that address security concerns related to LLMs. For example, harmful content tests, bias mitigation tests, sensitive data elements (SDE) leakage prevention tests, malicious prompt injection tests, hallucination tests, and so on.

A harmful content filtering test can include an automated evaluation that involves the identification and removal of offensive, inappropriate, or dangerous material. Harmful content an include explicit content, hate speech, cyberbullying, misinformation, scams, and so on. Harmful content filtering tests can include ensuring that an LLM application 130 does not include instructions that transmit harmful content to an LLM service 109. Harmful content filtering tests can include testing the response from the LLM service 109 for harmful content. This can also guide modification of the kinds of LLM inputs should be generated by the LLM application 130.

A bias mitigation test can include an automated evaluation that identifies and addresses biases in an LLM application 130. It involves measuring bias in outputs including LLM inputs for LLM services 109. Bias mitigation tests can include testing and filtering the response from the LLM service 109 for harmful content. This can also guide modification of the kinds of LLM inputs should be generated by the LLM application 130.

An SDE leakage test can include an automated evaluation that ensures sensitive data elements that are not output from an LLM application 130 as input to an LLM service 109. An SDE leakage test involves checking the LLM inputs from the LLM application 130 for a predetermined set of enterprise-specified SDEs, which can refer to proprietary or otherwise sensitive enterprise or personal information in terms, phrases, names, and so on.

An LLM hallucination test can include an automated evaluation that ensures the LLM inputs generated by an LLM application 130 do not cause an LLM service 109 to "hallucinate" or respond with false information, to a predetermined threshold. LLMs can sometimes generate responses that seem plausible but are actually inaccurate, fictional, or unsupported by facts. These inaccurate LLM responses can be referred to as "hallucinations." An LLM hallucination test can check whether the LLM inputs generated by an LLM application 130 are factually accurate according to a predetermined and stored factual knowledge base. The LLM hallucination test can check whether the responses received from the LLM service 109 are factually accurate according to a predetermined and stored knowledge base.

An LLM threat model test can include an automated evaluation that analyzes the LLM application 130 from the perspective of an attacker in order to identify and quantify security risks associated with LLM inputs generated by the LLM application 130 and responses from the LLM service 109. This can include decomposing the LLM application 130, determining and ranking an identified set of threats, and determining countermeasures and mitigations. An LLM threat model test can also be performed on the LLM itself, separately from interaction with the LLM application 130.

A prompt injection test can include an automated evaluation that analyzes the LLM application 130 to identify whether malicious prompt injections can be introduced by attackers in an attack on the LLM application 130 if it were released in a particular environment such as publicly or in an internal environment. In the various examples, the prompt injection test can include a test that checks whether prompt injection is possible, or whether prompt injection can or cannot be used for malicious purposes.

The various LLM tests can in some examples iteratively modify the code to modify the output from the application to the LLM service 109 and retest a predefined number of times or until the LLM application 130 passes the test. Modifications can include introduction of approved prompt injections and other transformations applied to the output from the application. The tests can provide a binary pass/fail or other verification score.

In some examples, the LLM test data 139 can include code that executes the LLM test. In further examples, LLM test data 139 can include local or remote network communication addresses and authentication information to access the LLM test. The LLM test data 139 can also include information that describes the LLM test, such as its provider, type or purpose, a set of verification status options for the test, a signature algorithm to use when creating an attestation for the LLM test, and other information. The verification status options can include a binary status such as true/false or verified/unverified, or other set of response options such as a percentage that indicates a confidence level or security level of the image or code tested. The status options can be indicated along with a format to provide a verification status in a signed LLM attestations 145.

The LLM security service 103 can include a service that includes programs and instructions that enable extending a SBOM to include LLM specific provenance parameters that enable signed LLM attestations 145 and attaches this LLM-extended SBOM 142 to an application build of an application or set of instructions that interacts with an LLM service 109. The LLM security service 103 can guide the attachment of signed LLM attestations 145 to the LLM-extended SBOM 142 that indicate the results of LLM specific tests performed in the supply chain and overall internal and external development and testing pipeline.

In some examples, the LLM security service 103 can provide cryptographic and other information to the LLM security champion services 107 that enables the LLM security champion services 107 to add signed attestations to an LLM-extended SBOM 142 and then return the LLM application 130 image. Alternatively, the LLM security service 103 can include programmatic application programming interfaces (APIs) that enable LLM security champion services 107 to invoke an API, providing LLM attestation information in order to add signed attestations to an LLM-extended SBOM 142. In some examples, the LLM security service 103 can be considered to include the cloud-hosted repository service 121. The LLM security libraries 136, the LLM test data 139, and the workflow actions 133, even if these are implemented using a local or cloud-hosted repository service 121.

The LLM security champion services 107 can refer to first- or third-party security champion services. The LLM security champion services 107 are shown separately from the computing environment 101, but in some examples, the network endpoints and computing systems of the LLM security champion services 107 can be first party services provided by the computing environment 101. A LLM security champion services 107 can refer to a manual service where individuals are designated as "security champions" examine the operation of the LLM application 130 and grade or score its security for LLM interactions with LLM services 109. This can include examination of code best practices as well as manually interacting with visual, audible, and programmatic interfaces of the LLM application 130 to ensure its security.

The LLM security libraries 136 can include a security framework of pre-built software components. The LLM security libraries 136 can include all or a subset of LLM tests outlined in the LLM test data 139. The LLM security libraries 136 can also include components that can generate an LLM-extended SBOM 142 and attach it to an LLM application 130 image or package. The LLM security libraries 136 can also include components that can implement or invoke the LLM tests and attach cryptographically signed LLM attestations 145 to the LLM-extended SBOM 142 or otherwise attach these attestations to the LLM application 130 image or package. The LLM security libraries 136 or the LLM security service 103 can define a LLM application supply chain or software development pipeline that indicates a number of steps, positions, or environments. Each of the steps, positions, or environments can be associated with a subset of the LLM tests identified in the LLM security libraries 136.

The LLM-extended SBOM 142 can refer to an SBOM that is extended to include signed LLM attestations 145 and other LLM specific parameters. The LLM-extended SBOM 142 can be a file that is specified in a particular file type and predetermined document format or data structure indicated in a standard specification. The file type used can include any text-based file type, JavaScript® Object Notation (JSON) file types, Yet Another Markup Language (YAML) file types, Extensible Markup Language (XML) file types, and others. The document data structure can include a Software Package Data Exchange (SPDX®), Cyclone Data Exchange (CycloneDX®), Common Platform Enumeration (CPE®) document data structure, and others. The document's data structure can indicate expected contents of an SBOM document, including necessary content and optional content that describes an application. The LLM-extended SBOM 142 can extend the contents indicated in a standard specification to additionally include one or more extensions for LLM specific parameters and signed attestations that describes the LLM application 130 and the LLM services 109.

The SBOM can include extensions that specify LLM specific signed attestations according to a predetermined format. The LLM specific parameters can specify a set of LLM services 109 that the LLM application 130 interacts with, an LLM bill of materials that describes each of these LLM services 109, and other parameters. The LLM parameters can be specified in an LLM attestations 145 that is signed using a cryptographic process that uniquely identifies a particular signer, which can indicate a trusted party. The LLM attestations 145 can indicate types of tests that have been performed. The LLM attestations 145 can also indicate a position of an LLM application 130 in a supply chain or software development pipeline. The position can refer to a particular repository 127, a particular development group or subgroup. The LLM attestations 145 can include a timestamp, and in some examples, the most recent LLM attestation 145 that includes a supply chain or pipeline position can indicate the current position.

The LLM security service 103 can add an LLM attestation 145 for pipeline position in response to identification of the LLM application 130 in a particular repository and validation of prerequisite LLM attestations 145 in the attached LLM-extended SBOM 142. Pipeline positions can in some examples be associated with particular repositories 127 or development environments, and can further indicate or associate responsible users, particular enterprise groups or business units, and so on.

An LLM attestation 145 can include information that describes an LLM test applicable to an LLM application 130. The LLM attestation 145 can include information such as its provider, type or purpose, a verification status resulting from an LLM test, a signature algorithm used for the LLM attestation 145, a key identifier of the signature, a value of the signature, and a timestamp indicating the date and time that the LLM test was run. The signed LLM attestation 145 can ensure that the signer, such as an entity associated with the LLM security service 103 or a third-party test, confirms that the test was performed and that the verification status is accurate.

The signed LLM attestations 145 provide supply chain security so that the tests performed to applications variants are verified by a trusted entity at each point in the supply chain or pipeline. This can include multiple different signers or a single signer associated with the LLM security service 103. An LLM attestation 145 can refer to attestations of tests performed on the LLM application 130 or an LLM or LLM service 109 that is used by the LLM application 130. In some examples, attestations for the LLM or LLM service 109 can be referred to as LLM attestations. An LLM attestation of the LLM can be one of the LLM attestations 145 if the associated LLM application 130 uses the LLM service 109.

The repository service 121 can include a first-party or third-party service with respect to the LLM security service 103. In some examples, the repository service 121 can include a customized instance of a service for repository management. The repository service 121 can include a cloud-based service or a locally hosted service in various examples, whether it is first- or third-party to the LLM security service 103. The repository service 121 can store and manage application images including the LLM applications 130. The repository service 121 can track and control changes to code of the LLM applications 130. The repository service 121 can provide a number of repositories 127 for various application images, including the LLM applications 130. The repositories 127 can include main and branch repositories that can enable management and tracking of versions and changes.

Branches can provide a safe sub-repository 127 for the developer to safely make changes to a particular subset of code without affecting the rest of a project and other versions or variants of the project. All of the changes in various branches of a main repository 127 can be tracked and reverted by the repository service 121. Generating a particular branch repository 127 or type of branch repository 127 can be associated with a starting point for an LLM testing pipeline or supply chain. The LLM security service 103 can use workflow actions 133 to detect generation of the branch repository 127 and perform the LLM testing and attach associated LLM attestations 145 to an LLM-extended SBOM 142 of the LLM application 130.

The client device 106 is representative of a plurality of client devices 106 that can be coupled to the network 112. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 154, such as liquid crystal displays (LCDs), gas plasma-based flat panel displays, organic light emitting diode (OLED) displays, electrophoretic ink ("E-ink") displays, projectors, or other types of display devices. In some instances, the displays 154 can be a component of the client device 106 or can be connected to the client device 106 through a wired or wireless connection.

The client device 106 can be configured to execute various applications such as a client application 160 or other applications. The client application 160 can be executed in a client device 106 to access network content served up by the computing environment 101 or other servers, thereby rendering a user interface 157 on the displays 154. To this end, the client application 160 can include a browser, a dedicated application, or other executable, and the user interface 157 can include a network page, an application screen, or other user mechanism for obtaining user input. The client device 106 can be configured to execute client applications 160 such as browser applications, chat applications, messaging applications, email applications, social networking applications, word processors, spreadsheets, or other applications.

The LLM service 109 can refer to an online platform or service that provides access to LLMs like GPT-3 (Generative Pre-trained Transformer 3), or other types of generative artificial intelligence models. The LLM service 109 can include a chatbot service or another type of service that allows developers, researchers, and businesses to develop LLM applications 130 that integrate the textual language generation capabilities of LLMs. LLM services 109 can include pre-trained models that have been trained on a large amount of text data. The LLMs learn and identify patterns in grammar and semantics in order to generate coherent and contextually relevant text. LLM services 109 can use natural language processing to perform tasks such as text generation, summarization, translation, sentiment analysis, question answering, text completion and other language-based processes. LLM services 109 can expose one or more APIs that enable LLM applications 130 to send text inputs and receive generated outputs from an LLM.

Figure 2:
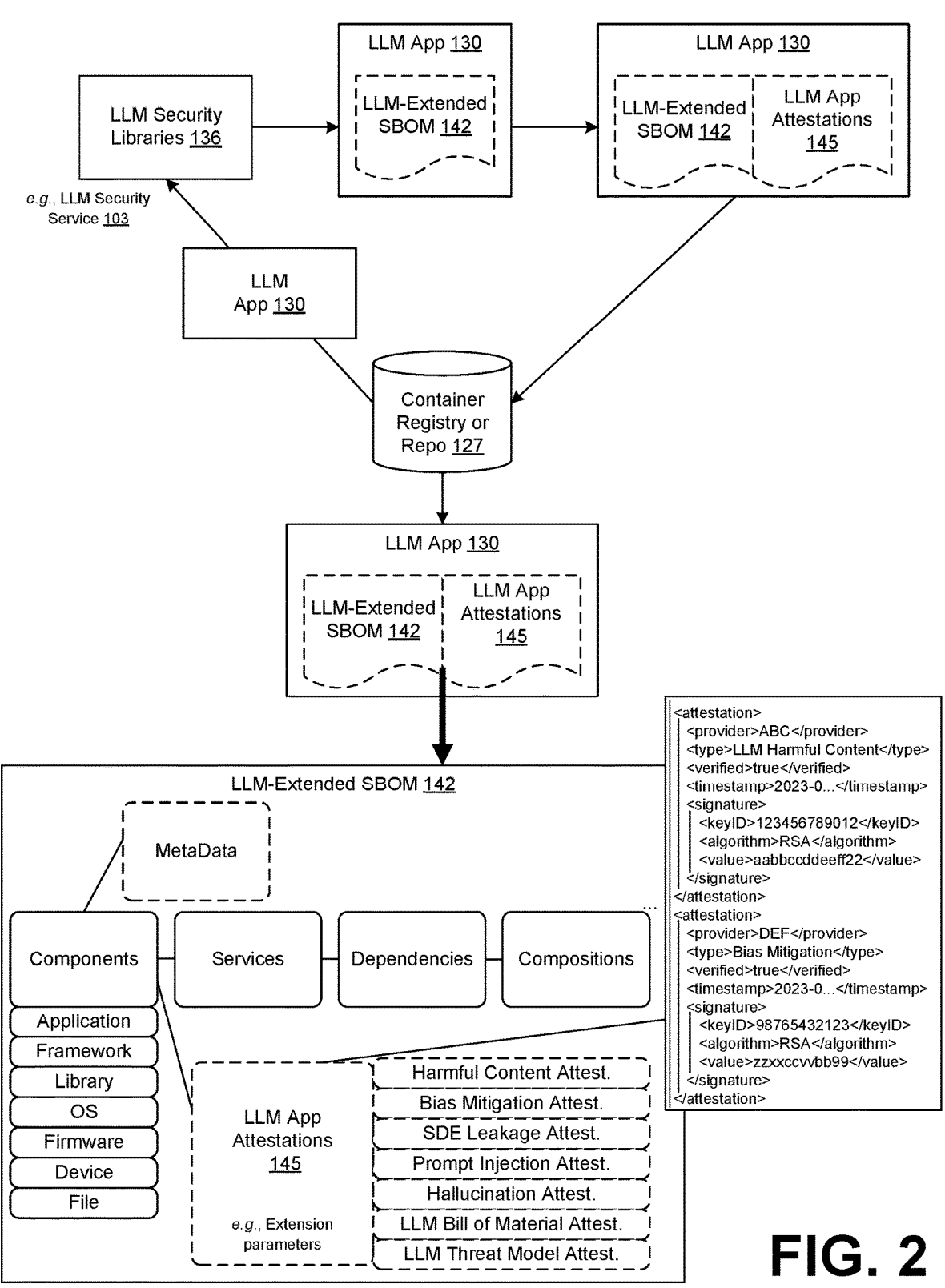
FIG. 2 illustrates an example of implementing LLM supply chain security using the components of the networked environment of FIG. 1 according to various embodiments of the present disclosure.

FIG. 2 illustrates an example of the components of the networked environment 100 of FIG. 1 implementing LLM supply chain security. Generally, this figure shows how the LLM security service 103 can use components of the networked environment 100 to automatically attach an LLM-extended SBOM 142 to an LLM application 130.

A repository 127 or container registry can include an image of an LLM application 130. When a new or modified LLM application 130 image is stored, for example by branching or another repository action, the LLM security service 103 can automatically process the LLM application 130 image to attach the LLM-extended SBOM 142 using the LLM security libraries 136. In some examples, this can include performing a static code analysis and a dynamic execution of the application to identify whether it interacts with an LLM service 109. This can include identifying a list of LLM services 109 with which it interacts. If the application is identified to interact with one or more LLM services 109, then it can be considered an LLM application 130.

The LLM security service 103 can then attach the LLM-extended SBOM 142 using the LLM security libraries 136. In some examples, the LLM-extended SBOM 142 can be attached including a bill of materials and a set of signed LLM attestations 145 associated with testing of the LLM services 109 independently of the LLM applications 130. The LLM attestations 145 that attest security testing of the LLM service 109 itself can be pre-stored in the datastore 124 and associated with the LLM service 109. A bill of materials for the LLM service 109 can also be pre-stored in the datastore 124 and associated with the LLM service 109. The bill of materials can include metadata, components, services, dependencies, compositions, and attestations for the performance of LLM service 109 independently from the LLM application 130.

The LLM application 130 can then be tested using automated and manual LLM interaction tests. The automated LLM interaction tests can be performed using the LLM security libraries 136 and the LLM test data 139. The LLM security service 103 can use the repository service 121 and the automated workflow actions 133 to perform the automated LLM interaction tests and generate LLM attestations 145 that indicate the verification results from the tests. The LLM security service 103 can use the repository service 121 and the automated workflow actions 133 to provide the LLM application 130 to a first- or third-party LLM security champion service 107 that performs a manual test of the LLM application 130 and generates LLM attestations 145 that indicate the verification results from the manual LLM test.

An illustrative example of an LLM-extended SBOM 142 is shown at the bottom of the figure. The LLM-extended SBOM 142 can include metadata, components, services, dependencies, and compositions. The overall LLM application 130, or a portion corresponding to one or more of the components, services, dependencies, and compositions, can be associated with a particular signed LLM attestation 145. The LLM attestations 145 can include a harmful content attestation, a bias mitigation attestation, an SDE leakage attestation, a prompt injection attestation, a hallucination attestation, an LLM bill of materials attestation, and an LLM threat model attestation. The LLM bill of materials attestations can refer to attestations of a bill of materials of the LLMs of the LLM services 109 that are used by the LLM application 130. This can indicate that the LLM contains acceptable components specified by the LLM security libraries 136. The LLM bill of materials attestation can be an LLM attestation for the LLM, and can also be an LLM attestation 145 since the LLM application 130 uses this LLM.

Figure 3:
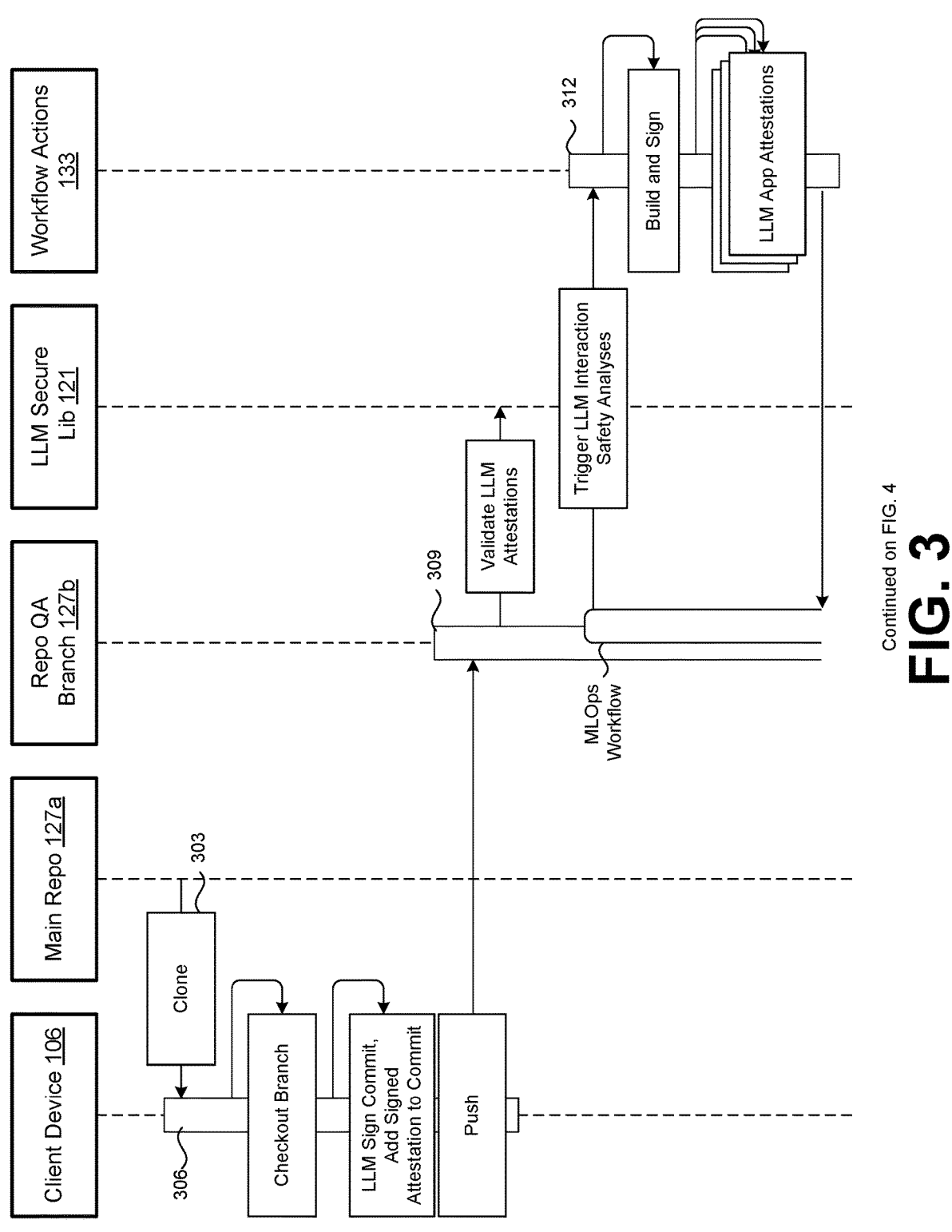
FIG. 3 is a sequence diagram illustrating the interactions between portions of the networked environment of FIG. 1 according to various embodiments of the present disclosure.

Referring next to FIG. 3, shown is a sequence diagram that provides one example of the interactions between the components of the networked environment 100 for LLM supply chain security. The sequence diagram of FIG. 3 provides merely an example of the many different types of functional arrangements that can be employed to implement the depicted interactions between the components of the networked environment 100. As an alternative, the sequence diagram of FIG. 3 can be viewed as depicting an example of elements of a method implemented within the networked environment 100. While blocks are generally described as performed using the LLM security service 103, this can include instructions executed by various components of the networked environment 100 including the repository service 121, client applications 160 of the client device 106, workflow actions 133, and others.

Beginning with block 303, the LLM security service 103 can clone an LLM application 130 image from the "main" repository 127*a*. The client device 106 can interact with a user interface generated by or in association with the LLM security service 103 or the repository service 121 in order to clone the LLM application 130. In various examples the cloned LLM application 130 image can be cloned to the client device 106, or to any datastore 124 accessible by the LLM security service 103 and/or the repository service 121.

In block 306, the LLM security service 103 can perform a process that checks out a branch repository such as the repository quality assurance branch 127*b*, generates an LLM signature for the commit or snapshot of the cloned LLM application 130. The client device 106 can also perform this process. The initial LLM commit signature can indicate initial tests and/or previously existing tests associated with the cloned LLM application 130. The LLM signature can also operate as an indication or identification that the LLM application 130 itself is a verified version of the LLM application 130 that is to be tested further. This block can include generating and attaching an LLM-extended SBOM 142 to the LLM application 130 image or package and adding the initial LLM commit signature to the LLM-extended SBOM 142 as a signed LLM attestation 145. The LLM security service 103 can store the LLM application 130 image or package, including the LLM-extended SBOM 142 and the initial LLM commit signature, in the repository quality assurance branch 127*b*.

In block 309, the LLM security service 103 can perform an automated programmatically performed LLM application test process for the LLM application 130. The LLM security service 103 can instruct or otherwise use the repository service 121, workflow actions 133, and other executable instructions in order to perform the LLM application test process as a machine learning operations (MLOps) workflow.

The LLM security service 103 can validate the initial LLM commit signature and any other initial LLM attestations 145 added in block 306. This ensures that the tests performed are performed on an initially validated LLM application 130. The validation can trigger an LLM interaction safety analysis that includes a number of automated LLM interaction tests.

In block 312, the LLM security service 103 can use workflow actions 133 to perform the automated LLM interaction tests. The LLM interaction tests can process the LLM application 130 in a process that includes dynamic execution of the LLM application 130 such that its LLM inputs (output from the application) can be measured and tested as discussed for the various security concerns. The process can include building and signing the LLM application 130. In some cases, the signature can be provided as further indication of a location in the supply chain and can be provided as a signed LLM attestation 145 in the LLM-extended SBOM 142.

Each of the LLM interaction tests can generate a test result such as a verification score or value. The tests themselves, or the LLM security service 103 can generate LLM attestations 145 for each of the automated or programmatically executed LLM interaction tests. In some examples, the LLM interaction tests can be performed in a sandboxed environment that does not interact with a specified LLM service 109, and in other examples the LLM interaction tests can be performed in a sandboxed environment that is isolated with the exception of a set of pre-approved endpoints of the LLM service 109 or services. In further examples, an LLM service 109 can be replicated or instantiated within the sandboxed environment rather than accessed over a public network. The process can continue in FIG. 4.

Figure 4:
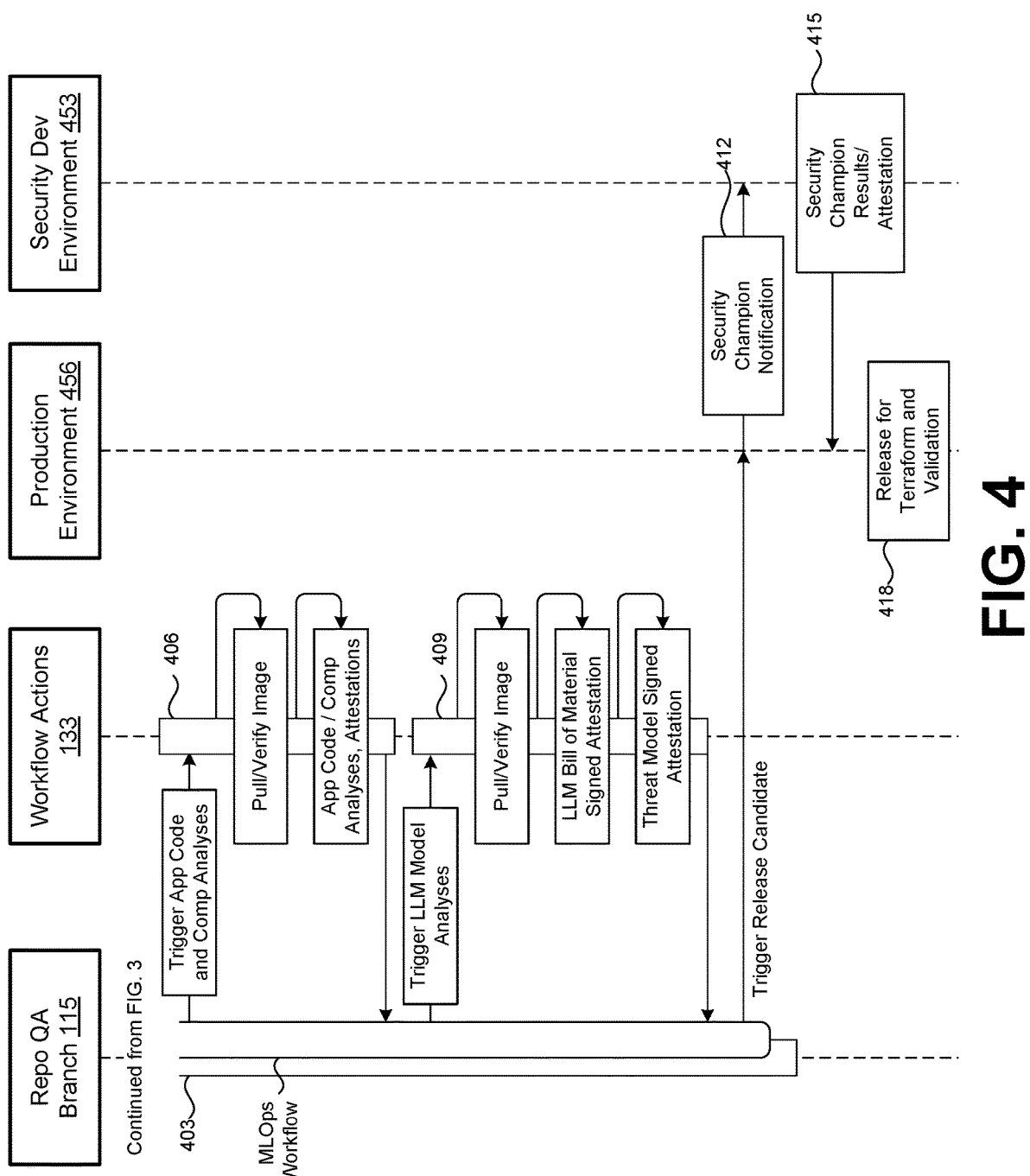
FIG. 4 is a sequence diagram illustrating the interactions between portions of the networked environment of FIG. 1 and continuing the sequence diagram of FIG. 3 according to various embodiments of the present disclosure.

Referring next to FIG. 4, shown is a sequence diagram that provides one example of the interactions between the components of the networked environment 100 for LLM supply chain security. The sequence diagram of FIG. 3 provides merely an example of the many different types of functional arrangements that can be employed to implement the depicted interactions between the components of the networked environment 100. As an alternative, the sequence diagram of FIG. 3 can be viewed as depicting an example of elements of a method implemented within the networked environment 100. While blocks are generally described as performed using the LLM security service 103, this can include instructions executed by various components of the networked environment 100 including the repository service 121, client applications 160 of the client device 106, workflow actions 133, and others.

In block 403, the LLM security service 103 continues the MLOps workflow. The process includes a software composition analysis and static test of the LLM application 130. The process can also include testing of the LLM service 109. While shown as continuing from the blocks of FIG. 3 and being triggered from the completion of one or more of those blocks, the processes shown in FIG. 4 can be performed in any order and in parallel with full or partial concurrence with aspects of FIG. 3.

In block 406, the LLM security service 103 triggers the workflow actions 133 to perform code and composition analyses of the LLM application 130. The code and composition analyses can be used to add general application information to the LLM-extended SBOM 142 as well as identify general and LLM specific threats.

A static code analysis can also be performed on the LLM application 130. The static code analysis can analyze the source code of the LLM application 130 to identify LLM specific issues, defects, and violations specified in the LLM security libraries 136. Rather than checking for open-source and third-party components and associating known risks, the static code analysis can check for problems within the bespoke code of the LLM application 130 itself. This can include syntax errors, logic flaws, and other vulnerabilities specified as LLM specific threats in the LLM security libraries 136. An LLM attestation 145 can be attached with a score or verification status for the static code analysis.

A software composition analysis can identify and manage open-source and third-party components used in the LLM application 130. The software composition analysis can analyze the dependencies, libraries, frameworks, and other external code resources of the LLM application 130 to assess their LLM specific security vulnerabilities, licensing information, and other risks in the LLM security libraries 136. An LLM attestation 145 can be attached with a score or verification status for the software composition analysis.

In block 409, the LLM security service 103 can perform LLM analyses of the LLM services 109 that the LLM application 130 interacts with. The LLM security service 103 can use workflow actions 133 or other components to pull an image of the LLM and perform a software composition analysis and a static code analysis of the LLM. An LLM attestation 145 with a verification status can be attached for each of these LLM analyses.

In block 412, the LLM security service 103 can transmit a security champion notification to a security developer environment 453. In some examples, the completion of the various tests of the MLOps workflow can trigger a release candidate of the LLM application 130. In various examples, the LLM security service 103 can perform a rules-based analysis that includes consideration of the verification statuses and other parameters of the LLM attestations 145 and other aspects of the LLM-extended SBOM 142.

If the rules-based analysis of the LLM-extended SBOM 142 indicates a threshold level production quality and safety value, then the LLM application 130 is provided to the production environment 456 as a production release candidate. The LLM security service 103 can use a component of the production environment 456 to transmit a security champion notification to the security developer environment 453. The security champion notification can include the LLM application 130 and LLM-extended SBOM 142, or a link to one or more of these elements.

In block 415, the security developer environment 453 can perform a manual test of the LLM application 130. The security developer environment 453 can include a first- or third-party computing environment used by a security champion user for manual testing of the LLM application 130. The manual test can result in a score or other verification status. In some examples, the results are passed back to a component of the LLM security service 103 such as the production environment 456, and the LLM security service 103 attaches LLM attestation 145 that indicates the verification status. Alternatively, the security developer environment 453 attaches the LLM attestation 145 to the LLM-extended SBOM 142 of the LLM application 130 and returns an image or package that includes these elements.

In block 418, the LLM security service 103 can use the production environment 456 and other components to release the programmatically and manually tested LLM application 130 for infrastructure provisioning and validation. This can include performing a rules-based analysis of the LLM attestations 145 to determine one or more predetermined action to perform such as publication of the LLM-extended SBOM 142 and the LLM attestations 145 to a particular network location, transmitting the LLM application 130 to a particular network location, provisioning a computing environment using the LLM application 130, and otherwise deploying the LLM application 130. This can include a deployment using infrastructure as code (IaC) through code, where computing environment infrastructure configurations are written in a human-readable and version-controlled format.

The network location for publication and can include a network endpoint of a website, distributed application, datastore, repository, and so on. In some examples, the network location is available to enterprises affiliated of the LLM security service 103. Access can be controlled using certificates, passcodes, tokens, and other authentication credentials. The rules-based analysis includes consideration of the verification statuses and other parameters of the LLM attestations 145 and other aspects of the LLM-extended SBOM 142.

If the rules-based analysis of the LLM-extended SBOM 142 indicates a threshold associated with a final release quality and safety value, then a specified one or more action can be performed using the LLM application 130. In some examples, the LLM application is provided to the production environment 456 as a release candidate for a final release and deployment. The final release and deployment of the LLM application 130 can include updating infrastructure configurations and provisioning the computing environment to execute the new or updated LLM application 130. This can include creating, modifying, and deleting resources in cloud platforms, data centers, and other infrastructure providers to push the LLM application 130 into live operation.

If the rules-based analysis of the LLM-extended SBOM 142 indicates a threshold that is incommensurate with the final release quality and safety value, then another specified action or actions can be performed using the LLM application 130 and attached LLM-extended SBOM 142. For example, the LLM application 130 can be transmitted back to a particular repository 127 for developer attention and correction. In some examples, the LLM application 130 can be transmitted can be transmitted along with a specification of which LLM test was failed, and a particular aspect of the test that was failed. A notification can be transmitted to a client device 106 or user interface of a developer, and the notification can include an identification of the LLM test that failed, a unique identifier of an aspect of the test that failed, and a textual description that specifies why the LLM application 130 failed the test. The LLM security service 103 can extract this information from LLM attestation 145.

Figure 5:
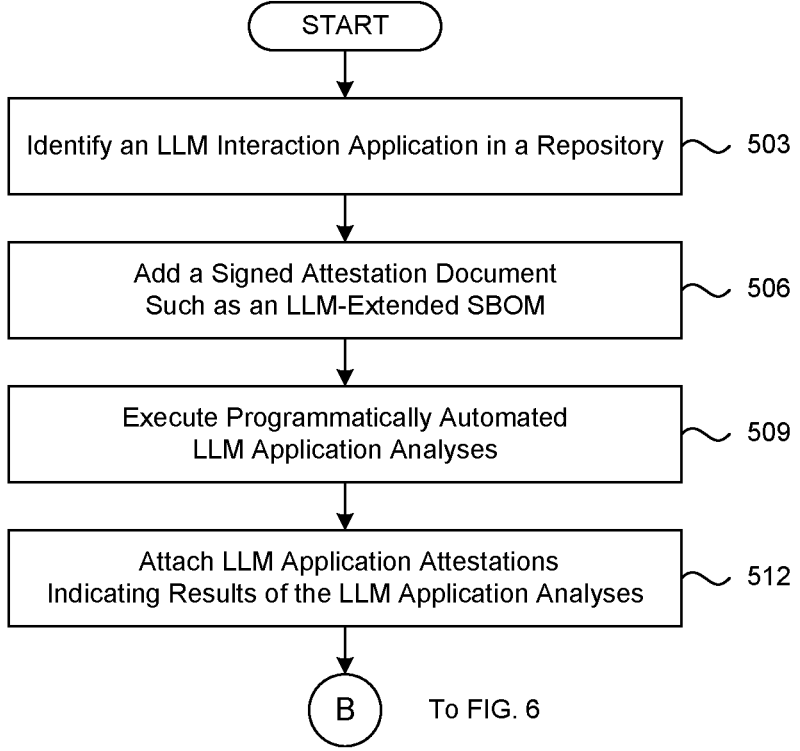
FIG. 5 is a flowchart illustrating functionality of components of the networked environment of FIG. 1 according to various embodiments of the present disclosure.

FIG. 5 shows a flowchart providing an example of LLM supply chain security implemented using the LLM security service 103 and other components of the networked environment 100. The flowchart of FIG. 5 provides merely an example of the many different types of functional arrangements that can be employed to implement the depicted interactions between the components of the networked environment 100. As an alternative, the flowchart of FIG. 5 can be viewed as depicting an example of elements of a method implemented within the networked environment 100. While blocks are generally described as performed using the LLM security service 103, this can include instructions executed by various components of the networked environment 100 including the repository service 121, client applications 160 of the client device 106, workflow actions 133, and others.

In block 503, the LLM security service 103 can identify an LLM Application from a repository 127. For example, the LLM security service 103 can clone an LLM application 130 image from a main repository 127. A client device 106 can interact with a user interface in order to instruct the LLM security service 103 to clone the LLM application 130.

In block 506, the LLM security service 103 can generate and attach an LLM-extended SBOM 142 to the LLM application 130 image or package and add an LLM commit signature to the LLM-extended SBOM 142 as a signed LLM attestation 145. The LLM-extended SBOM 142 can refer to an SBOM that is extended to include LLM specific parameters such as a set of LLM services 109 that the LLM application 130 interacts with, an LLM bill of materials that describes each of these LLM services 109 as well as any certifications or attestations based on analyses of the LLM services 109 themselves independently from the LLM application 130, and the LLM attestations 145. The LLM commit signature can indicate initial tests and/or previously existing tests associated with the cloned LLM application 130. The LLM signature can also operate as an indication or identification that the LLM application 130 itself is a verified version of the LLM application 130 that is to be tested further. The LLM security service 103 can store the LLM application 130 image or package, including the LLM-extended SBOM 142 and the initial LLM commit signature, in a quality assurance branch repository 127.

In block 509, the LLM security service 103 can perform an automated LLM application test process for the LLM application 130. The LLM security service 103 can instruct or otherwise use the repository service 121, workflow actions 133, and other executable instructions in order to perform the LLM application test process as a machine learning operations (MLOps) workflow. The LLM security service 103 can use workflow actions 133 to perform the automated LLM interaction tests. The LLM interaction tests can process the LLM application 130 in a process that includes dynamic execution of the LLM application 130 such that its LLM inputs (output from the application) can be measured and tested as discussed for the various security concerns. The process can include building and signing the LLM application 130. In some cases the signature can be provided as further indication of a location in the supply chain, and can be provided as a signed LLM attestation 145 in the LLM-extended SBOM 142.

In block 512, the LLM security service 103 can attach LLM attestations 145 based on the automated tests. Each of the LLM interaction tests can generate a test result such as a verification score or value. The tests themselves, or the LLM security service 103 can generate LLM attestations 145 for each of the automated or programmatically executed LLM interaction tests. The LLM security service 103 can attach these LLM attestations 145 to the LLM-extended SBOM 142 to update the LLM application 130 image or package.

Figure 6:
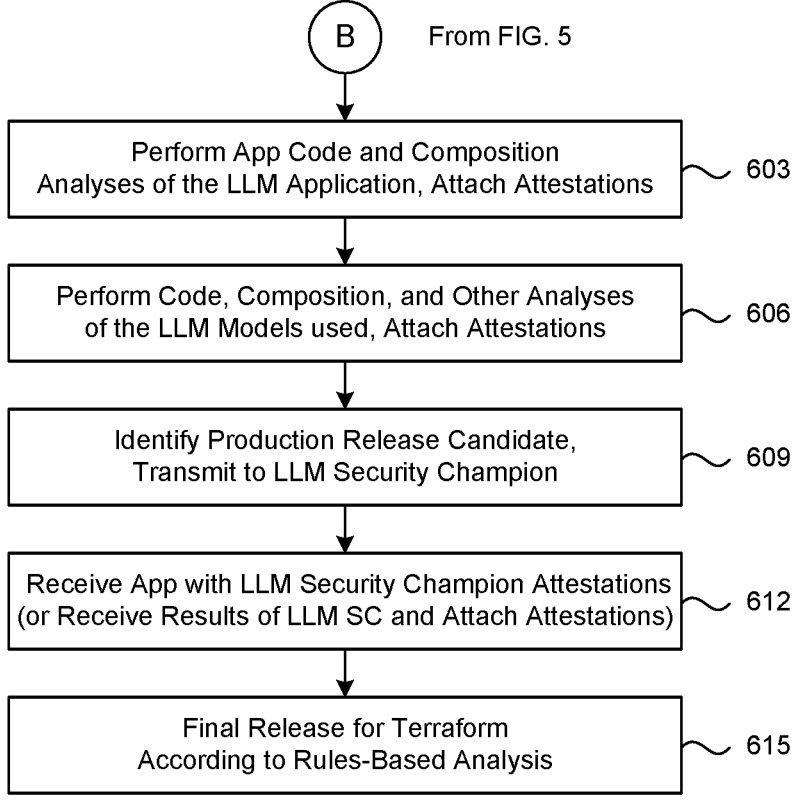
FIG. 6 is a flowchart illustrating functionality of components of the networked environment of FIG. 1 and continuing the flowchart of FIG. 5 according to various embodiments of the present disclosure.

FIG. 6 shows a flowchart that expands on the flowchart of FIG. 5, providing an example of LLM supply chain security implemented using the LLM security service 103 and other components of the networked environment 100. The flowchart of FIG. 6 provides merely an example of the many different types of functional arrangements that can be employed to implement the depicted interactions between the components of the networked environment 100. As an alternative, the flowchart of FIG. 6 can be viewed as depicting an example of elements of a method implemented within the networked environment 100. While blocks are generally described as performed using the LLM security service 103, this can include instructions executed by various components of the networked environment 100 including the repository service 121, client applications 160 of the client device 106, workflow actions 133, and others.

In block 603, the LLM security service 103 can perform code and composition analyses of the LLM application 130. The code and composition analyses can be used to add general application information to the LLM-extended SBOM 142 as well as identify general and LLM specific threats.

The LLM security service 103 can perform a static code analysis on the LLM application 130. The static code analysis can analyze the source code of the LLM application 130 to identify LLM specific issues, defects, and violations specified in the LLM security libraries 136. Rather than checking for open-source and third-party components and associating known risks, the static code analysis can check for problems within the bespoke code of the LLM application 130 itself. This can include syntax errors, logic flaws, and other vulnerabilities specified as LLM specific threats in the LLM security libraries 136. An LLM attestation 145 can be attached with a score or verification status for the static code analysis.

The LLM security service 103 can perform a software composition analysis that identifies and manages open-source and third-party components used in the LLM application 130. The software composition analysis can analyze the dependencies, libraries, frameworks, and other external code resources of the LLM application 130 to assess their LLM specific security vulnerabilities, licensing information, and other risks in the LLM security libraries 136. An LLM attestation 145 can be attached with a score or verification status for the software composition analysis.

In block 606, the LLM security service 103 can perform code, composition, and dynamic analyses of the LLM services 109. The LLM security service 103 can use workflow actions 133 or other components to pull an image of the LLM for each of the LLM services 109 that the LLM application 130 uses. The LLM security service 103 can perform the software composition analysis and the static code analysis or static application safety test of the LLM. An LLM attestation 145 with a verification status can be attached for each of these analyses.

In block 609, the LLM security service 103 can transmit a security champion notification to a security developer environment 453. In some examples, the completion of the various LLM application tests can trigger a release candidate of the LLM application 130. In various examples, the LLM security service 103 can perform a rules-based analysis that includes consideration of the verification statuses and other parameters of the LLM attestations 145 and other aspects of the LLM-extended SBOM 142.

If the rules-based analysis of the LLM-extended SBOM 142 indicates a threshold level production quality and safety value, then the LLM application 130 is provided to the production environment 456 as a production release candidate. The LLM security service 103 can use a component of the production environment 456 to transmit a security champion notification to the security developer environment 453. The security champion notification can include the LLM application 130 and LLM-extended SBOM 142, or a link to one or more of these elements. The security developer environment 453 can perform a manual test of the LLM application 130. The security developer environment 453 can include a first- or third-party computing environment used by a security champion user for manual testing of the LLM application 130. The manual test can result in a score or other verification status.

In block 612, the LLM security service 103 can receive an updated image of the LLM application 130 that includes a "security champion" LLM attestation 145. For example, the security developer environment 453 can perform the manual security champion testing and generate an LLM attestation 145. The security developer environment 453 can attach the LLM attestation 145 to the LLM-extended SBOM and return an updated image or package to the LLM security service 103. Alternatively, the security developer environment 453 can perform the manual security champion testing and return the verification status or test results to the LLM security service 103. The LLM security service 103 can attach the "security champion" LLM attestation 145 to the LLM-extended SBOM In block 615, the LLM security service 103 can use the production environment 456 and other components to release the programmatically and manually tested LLM application 130 for final deployment and validation. This can include publication of the LLM attestations 145 of the LLM-extended SBOM 142, and performing a rules-based analysis of the LLM attestations 145. The rules-based analysis includes consideration of the verification statuses and other parameters of the LLM attestations 145 and other aspects of the LLM-extended SBOM 142, which now includes attestations for programmatically automated and manual tests.

If the rules-based analysis of the LLM-extended SBOM 142 indicates a threshold level final release quality and safety value, then the LLM application 130 is provided to the production environment 456 as a release candidate for a final release and deployment. The deployment can include updating and provisioning infrastructures and computing environments to execute the new or updated LLM application 130. This can include creating, modifying, and deleting resources in cloud platforms, data centers, and other infrastructure providers to push the LLM application 130 into live operation.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random-access portion of the memory and run by the processor, source code that can be expressed in proper format such as object code that is capable of being loaded into a random-access portion of the memory and executed by the processor, or source code that can be interpreted by another executable program to generate instructions in a random-access portion of the memory to be executed by the processor. An executable program can be stored in any portion or component of the memory, including random-access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages could be added to the logical flow described herein, for purposes of enhanced utility, accounting, performance measurement, or providing troubleshooting aids, etc. It is understood that all such variations are within the scope of the present disclosure.

The sequence diagrams and flowcharts provide a general description of the operation of the various components. Although the general descriptions can provide provides an example of the interactions between the various components, other interactions between the various components are also possible according to various embodiments of the present disclosure. Interactions described with respect to a particular figure or sequence diagram can also be performed in relation to the other figures and sequence diagrams herein.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:

at least one computing device comprising at least one processor and at least one memory; and machine-readable instructions stored in the at least one memory that, when executed by the at least one processor, cause the at least one computing device to at least:

identify a large language model (LLM) application that is programmed to communicate with an LLM service that provides access to an LLM;

attach, to an image or package comprising the LLM application, an LLM-extended software bill of materials that is extended to provide LLM specific supply chain information for the LLM application;

execute an automated LLM security test of the LLM application;

attach, to the LLM-extended software bill of materials, a signed LLM security test attestation based at least in part on completion of the automated LLM security test; and transmit, to a predetermined network endpoint, at least one of: the LLM application, the LLM-extended software bill of materials, or any combination thereof.

2. The system of claim 1, wherein the LLM-extended software bill of materials is published or transmitted to the predetermined network endpoint based at least in part on a result of a rules-based analysis of a plurality of LLM specific attestations in the LLM-extended software bill of materials.

3. The system of claim 1, wherein the machine-readable instructions, when executed by the at least one processor, further cause the at least one computing device to at least:

retrieve an LLM of the LLM service; and execute at least one test of the LLM, wherein an additional signed LLM security test attestation is attached to the LLM-extended software bill of materials based at least in part on completion of the test of the LLM.

4. The system of claim 1, wherein the machine-readable instructions, when executed by the at least one processor, further cause the at least one computing device to at least:

transmit the LLM application to a security developer environment for a manual LLM security test, wherein an additional signed LLM security test attestation is attached to the LLM-extended software bill of materials based at least in part on completion of the manual LLM security test.

5. The system of claim 1, wherein the automated LLM security test is executed as one of a plurality of automated LLM security tests specified in an LLM security library, and a plurality of LLM security test attestations are attached to the LLM-extended software bill of materials, a respective one of the LLM security test attestations corresponding to the plurality of automated LLM security tests.

6. The system of claim 5, wherein the plurality of automated LLM security tests specified in the LLM security library comprise at least one of: a harmful content test, a bias mitigation test, a secure data leakage test, a prompt injection test, an LLM hallucination test, or any combination thereof.

7. The system of claim 1, wherein the LLM-extended software bill of materials is attached to the image or the package in response to storing the LLM application in a particular data repository.

8. A method, comprising:

identifying a large language model (LLM) application that is programmed to communicate with an LLM service that provides access to an LLM;

attaching, to an image or package comprising the LLM application, an LLM-extended software bill of materials that is extended to provide LLM specific supply chain information for the LLM application;

executing an automated LLM security test of the LLM application;

attaching, to the LLM-extended software bill of materials, a signed LLM security test attestation based at least in part on completion of the automated LLM security test; and transmitting, to a predetermined network endpoint, at least one of: the LLM application, the LLM-extended software bill of materials, or any combination thereof.

9. The method of claim 8, wherein the LLM application is identified based at least in part on generating a branch repository to store a particular version or build of the LLM application.

10. The method of claim 8, wherein the automated LLM security test is performed based at least in part on validation of an LLM pipeline attestation from the LLM-extended software bill of materials, wherein the LLM pipeline attestation indicates a position in an LLM specific software development pipeline.

11. The method of claim 8, further comprising:

transmitting the LLM application to a security developer environment, wherein a manual test of the LLM application is performed in the security developer environment.

12. The method of claim 11, further comprising:

receiving, from the security developer environment, the LLM application, and the LLM-extended software bill of materials comprising an additional LLM security test attestation indicating a result of the manual test.

13. The method of claim 11, further comprising:

receiving, from the security developer environment, a result of the manual test of the LLM application; and attaching, to the LLM-extended software bill of materials of the LLM application, an additional LLM security test attestation indicating a result of the manual test.

14. The method of claim 8, further comprising:

provisioning a networked computing environment to deploy and execute the LLM application.

15. A system, comprising:

at least one computing device comprising at least one processor and at least one memory; and machine-readable instructions stored in the at least one memory that, when executed by the at least one processor, cause the at least one computing device to at least:

attach, to an image or package comprising an LLM application that is programmed to communicate with an LLM service, an LLM-extended software bill of materials that is extended to provide LLM specific supply chain information for the LLM application;

execute an automated LLM security test of the LLM application;

attach, to the LLM-extended software bill of materials, a signed LLM security test attestation based at least in part on completion of the automated LLM security test; and publish or transmit, to a predetermined network endpoint, at least one of: the LLM application, the LLM-extended software bill of materials, or any combination thereof.

16. The system of claim 15, wherein the LLM-extended software bill of materials is attached to the image or the package based at least in part on storing the LLM application in a branch repository.

17. The system of claim 15, wherein the LLM specific supply chain information includes an LLM pipeline attestation that indicates a position in an LLM specific software development pipeline.

18. The system of claim 15, wherein the machine-readable instructions, when executed by the at least one processor, further cause the at least one computing device to at least:

transmit the LLM application to a security developer environment for a manual test.

19. The system of claim 18, wherein the machine-readable instructions, when executed by the at least one processor, further cause the at least one computing device to at least:

receive, from the security developer environment, the LLM application, and the LLM-extended software bill of materials comprising an additional LLM security test attestation indicating a result of the manual test.

20. The system of claim 18, wherein the machine-readable instructions, when executed by the at least one processor, further cause the at least one computing device to at least:

receive, from the security developer environment, a result of the manual test of the LLM application; and attach, to the LLM-extended software bill of materials of the LLM application, an additional LLM security test attestation indicating a result of the manual test.

* * * * *